(12) United States Patent
Li et al.

(10) Patent No.: US 12,525,276 B2
(45) Date of Patent: Jan. 13, 2026

(54) MEMORY DEVICE AND MEMORY SYSTEM FOR PERFORMING RESISTOR OFFSET CALIBRATION TRAINING

(71) Applicant: YANGTZE MEMORY TECHNOLOGIES CO., LTD., Wuhan (CN)

(72) Inventors: Zhefan Li, Wuhan (CN); Huangpeng Zhang, Wuhan (CN); Jiahao Chen, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 140 days.

(21) Appl. No.: 18/384,249

(22) Filed: Oct. 26, 2023

(65) Prior Publication Data
US 2025/0095711 A1 Mar. 20, 2025

Related U.S. Application Data

(63) Continuation of application No. PCT/CN2023/118719, filed on Sep. 14, 2023.

(51) Int. Cl.
*G11C 11/4076* (2006.01)
*G11C 11/4093* (2006.01)

(52) U.S. Cl.
CPC ...... *G11C 11/4076* (2013.01); *G11C 11/4093* (2013.01); *G11C 2207/2254* (2013.01)

(58) Field of Classification Search
CPC ............ G11C 11/4076; G11C 11/4093; G11C 11/4096; G11C 2207/2254; G11C 7/1057;
(Continued)

(56) References Cited

U.S. PATENT DOCUMENTS

| 2019/0362773 A1 | 11/2019 | Spirkl |
| 2021/0067385 A1 | 3/2021 | Finn |
| 2022/0329463 A1* | 10/2022 | Hormati ................ H04L 7/033 |

FOREIGN PATENT DOCUMENTS

TW 202133155 A 9/2021

OTHER PUBLICATIONS

International Search Report issued in corresponding International Application No. PCT/CN2023/118719, mailed on Mar. 15, 2024, 5 pages.

(Continued)

*Primary Examiner* — Sultana Begum
(74) *Attorney, Agent, or Firm* — BAYES PLLC

(57) ABSTRACT

According to one aspect of the present disclosure, a peripheral circuit is provided. The peripheral circuit may include a DQ circuit comprising a plurality of decision feedback equalization (DFE) components. The peripheral circuit may include a resistor offset calibration (RXOC) circuit. The RXOC circuit may include an oscillator. The oscillator may generate an internal clock source. The RXOC circuit may include a DQ-selection component. The DQ-selection component may select a DFE component of the plurality of DFE components for calibration. The DQ-selection component may output a slicer result signal indicating an offset value received from the DFE component. The RXOC circuit may include control logic. The control logic may send a calibration signal associated with the DFE component to the DQ circuit based on the slicer result signal.

20 Claims, 11 Drawing Sheets

(58) Field of Classification Search
CPC ..... G11C 7/1084; G11C 7/1048; G11C 7/222; G11C 29/022; G11C 29/12015; G11C 29/028
See application file for complete search history.

(56) References Cited

OTHER PUBLICATIONS

Communication pursuant to Article 94(3) EPC issued in corresponding European Application No. 23793692.7, mailed on Sep. 9, 2025, 5 pages.
Lee Chang-Kyo et all: "An 8.5-GB LPDDR5 SDRAM With a Hybrid-Bank Architecture, Low Power, and Speed-Boosting Techniques", IEEE Journal of Solid-State Circuits, IEEE, USA, vol. 56, No. 1, Sep. 2, 2020 (Sep. 2, 2020), pp. 212-224, XPO11828601, ISSN: 0018-9200,DOI: 10.1109/jssc.220.3017775.

\* cited by examiner

MEMORY DEVICE AND MEMORY SYSTEM FOR PERFORMING RESISTOR OFFSET CALIBRATION TRAINING

CROSS-REFERENCE TO RELATED APPLICATIONS

This application is a continuation of International Application No. PCT/CN2023/118719, filed on Sep. 14, 2023, entitled "MEMORY DEVICE AND MEMORY SYSTEM FOR PERFORMING RESISTOR OFFSET CALIBRATION TRAINING," which is incorporated herein by reference in its entirety.

BACKGROUND

The present disclosure relates to memory devices and operation methods thereof.

Offset calibration training for adjusting a DQ resistor offset calibration (RXOC) training may be performed during power-up and initialization training sequence to cope with static-dynamic random-access memory (SDRAM) condition changes.

SUMMARY

According to one aspect of the present disclosure, a peripheral circuit is provided. The peripheral circuit may include a DQ circuit comprising a plurality of decision feedback equalization (DFE) components. The peripheral circuit may include a resistor offset calibration (RXOC) circuit. The RXOC circuit may include an oscillator. The oscillator may be configured to generate an internal clock source. The RXOC circuit may include a DQ-selection component. The DQ-selection component may be configured to select a DFE component of the plurality of DFE components for calibration. The DQ-selection component may be configured to output a slicer result signal indicating an offset value received from the DFE component. The RXOC circuit may include control logic. The control logic may be configured to send a calibration signal associated with the DFE component to the DQ circuit based on the slicer result signal.

In some implementations, the DQ-selection component may include a first multiplexer (MUX) and a second MUX. In some implementations, the first MUX is configured to select the DQ circuit. In some implementations, the second MUX is configured to select the DFE component of the DQ circuit.

In some implementations, the control logic may be further configured to receive the slicer result signal at a first edge of a clock cycle associated with the internal clock source.

In some implementations, the control logic may be further configured to perform a binary search based on the slicer result signal to identify a pull-up code or a pull-down code for the DFE component.

In some implementations, the control logic may be further configured to send the calibration signal to the DQ circuit at a second edge the clock cycle associated with the internal clock source. In some implementations, the first edge may be one of a rising edge or a falling edge. In some implementations, the second edge may be another of the rising edge or the falling edge. In some implementations, the calibration signal may include the pull-up code or the pull-down code.

In some implementations, the DQ circuit may be further configured to calibrate the DFE component based on a pull-up code or a pull-down code included in the calibration signal received from the control logic at the second edge of the clock cycle.

In some implementations, the oscillator may be further configured to receive an RXOC engage signal. In some implementations, the internal clock source may be generated in response to receiving the RXOC engage command.

In some implementations, the oscillator may be caused to generate the internal clock source without a column address strobe (CAS) command.

According to another aspect of the present disclosure, a memory device is provided. The memory device may include a memory array and a peripheral circuit coupled to the memory array. The peripheral circuit may include a DQ circuit comprising a plurality of DFE components. The peripheral circuit may include an RXOC circuit. The RXOC circuit may include an oscillator. The oscillator may be configured to generate an internal clock source. The RXOC circuit may include a DQ-selection component. The DQ-selection component may be configured to select a DFE component of the plurality of DFE components for calibration. The DQ-selection component may be configured to output a slicer result signal indicating an offset value received from the DFE component. The RXOC circuit may include control logic. The control logic may be configured to send a calibration signal associated with the DFE component to the DQ circuit based on the slicer result signal.

In some implementations, the DQ-selection component may include a first MUX and a second MUX. In some implementations, the first MUX is configured to select the DQ circuit. In some implementations, the second MUX is configured to select the DFE component of the DQ circuit.

In some implementations, the control logic may be further configured to receive the slicer result signal at a first edge of a clock cycle associated with the internal clock source.

In some implementations, the control logic may be further configured to perform a binary search based on the slicer result signal to identify a pull-up code or a pull-down code for the DFE component.

In some implementations, the control logic may be further configured to send the calibration signal to the DQ circuit at a second edge the clock cycle associated with the internal clock source. In some implementations, the first edge may be one of a rising edge or a falling edge. In some implementations, the second edge may be another of the rising edge or the falling edge. In some implementations, the calibration signal may include the pull-up code or the pull-down code.

In some implementations, the DQ circuit may be further configured to calibrate the DFE component based on a pull-up code or a pull-down code included in the calibration signal received from the control logic at the second edge of the clock cycle.

In some implementations, the oscillator may be further configured to receive an RXOC engage signal. In some implementations, the internal clock source may be generated in response to receiving the RXOC engage command.

In some implementations, the oscillator may be caused to generate the internal clock source without a CAS command.

According to a further aspect of the present disclosure, a method for RXOC by a peripheral circuit is provided. The method may include generating, by an oscillator of an RXOC circuit, an internal clock source. The method may include selecting, by a DQ-selection component of an RXOC circuit, a DFE component from a plurality of DFE components of a DQ circuit for calibration. The method may include outputting, by the DQ-selection component of the RXOC circuit, a slicer result signal indicating an offset value received from the DFE component. The method may include sending, by control logic of the RXOC circuit, a calibration signal associated with the DFE component to the DQ circuit based on the slicer result signal.

In some implementations, the DQ-selection component may include a first MUX and a second MUX. In some implementations, the first MUX may be configured to select the DQ circuit. In some implementations, the second MUX may be configured to select the DFE component of the DQ circuit.

In some implementations, the method may include receiving, by the control logic of the RXOC circuit, the slicer result signal at a first edge of a clock cycle associated with the internal clock source.

In some implementations, the method may include performing, by the control logic of the RXOC circuit, a binary search based on the slicer result signal to identify a pull-up code or a pull-down code for the DFE component.

In some implementations, the method may include sending, by the control logic of the RXOC circuit, the calibration signal to the DQ circuit at a second edge the clock cycle associated with the internal clock source. In some implementations, the first edge may be one of a rising edge or a falling edge. In some implementations, the second edge may be another of the rising edge or the falling edge. In some implementations, the calibration signal may include the pull-up code or the pull-down code.

In some implementations, the method may include calibrating, by the DQ circuit of the RXOC circuit, the DFE component based on a pull-up code or a pull-down code included in the calibration signal received from the control logic at the second edge of the clock cycle.

In some implementations, the method may include receiving, by the oscillator of the RXOC circuit, an RXOC engage signal. In some implementations, the internal clock source may be generated in response to receiving the RXOC engage command.

In some implementations, the oscillator may be caused to generate the internal clock source without a CAS command.

According to still another aspect of the present disclosure, a memory system is provided. The memory system may include a memory array and a peripheral circuit. The peripheral circuit may include a DQ circuit comprising a plurality of DFE components. The peripheral circuit may include an RXOC circuit. The RXOC circuit may include an oscillator. The oscillator may be configured to generate an internal clock source. The RXOC circuit may include a DQ-selection component. The DQ-selection component may be configured to select a DFE component of the plurality of DFE components for calibration. The DQ-selection component may be configured to identify an offset value associated with the DFE component. The DQ-selection component may be configured to output a slicer result signal received from the DFE component based on the offset value. The RXOC circuit may include control logic. The control logic may be configured to send a calibration signal associated with the DFE component to the DQ circuit based on the slicer result signal.

In some implementations, the DQ-selection component may include a first MUX and a second MUX. In some implementations, the first MUX is configured to select the DQ circuit. In some implementations, the second MUX is configured to select the DFE component of the DQ circuit.

In some implementations, the control logic may be further configured to receive the slicer result signal at a first edge of a clock cycle associated with the internal clock source.

In some implementations, the control logic may be further configured to perform a binary search based on the slicer result signal to identify a pull-up code or a pull-down code for the DFE component.

In some implementations, the control logic may be further configured to send the calibration signal to the DQ circuit at a second edge the clock cycle associated with the internal clock source. In some implementations, the first edge may be one of a rising edge or a falling edge. In some implementations, the second edge may be another of the rising edge or the falling edge. In some implementations, the calibration signal may include the pull-up code or the pull-down code.

In some implementations, the DQ circuit may be further configured to calibrate the DFE component based on a pull-up code or a pull-down code included in the calibration signal received from the control logic at the second edge of the clock cycle.

In some implementations, the oscillator may be further configured to receive an RXOC engage signal. In some implementations, the internal clock source may be generated in response to receiving the RXOC engage command.

In some implementations, the oscillator may be caused to generate the internal clock source without a CAS command.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
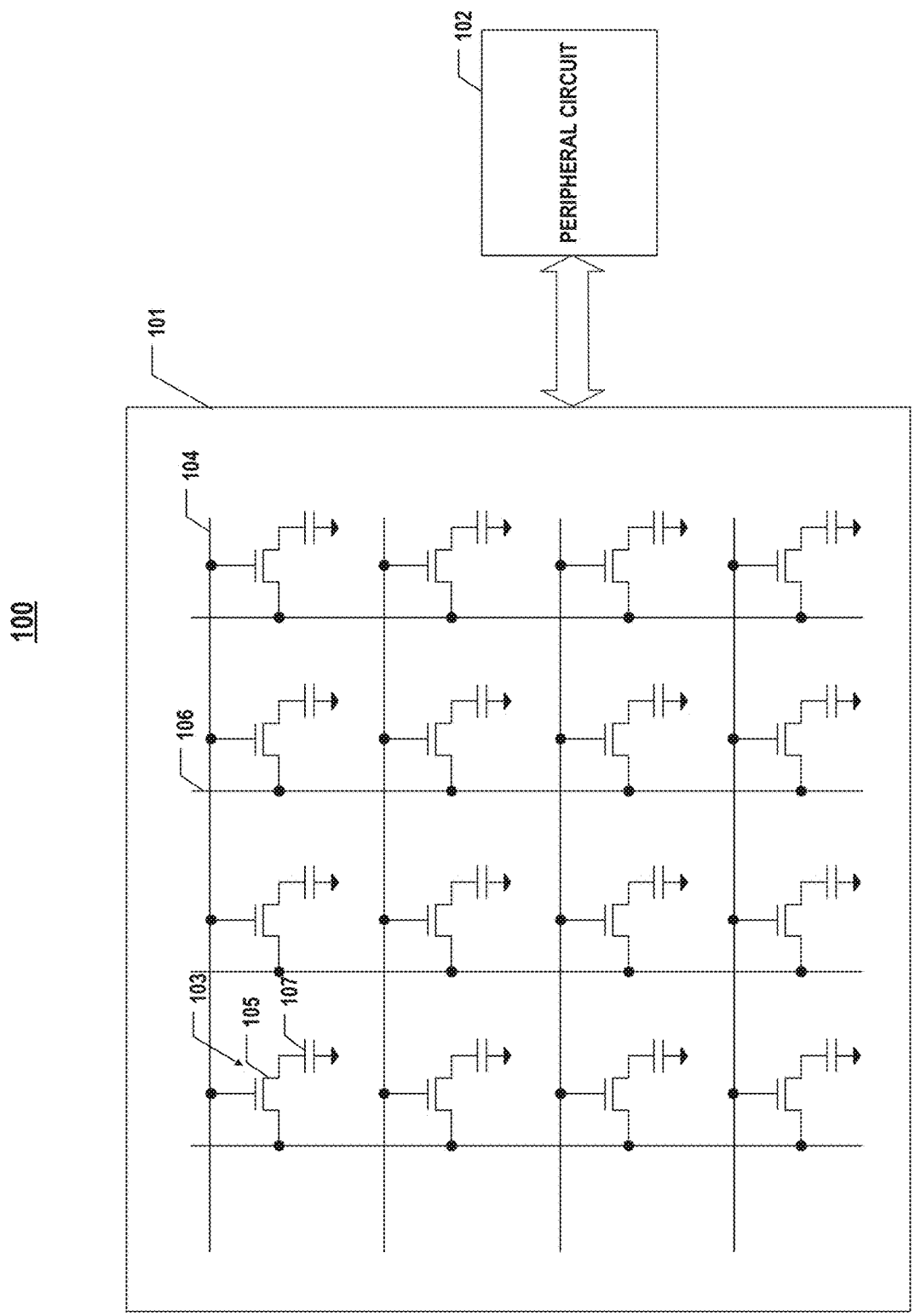
FIG. 1 illustrates a schematic circuit diagram of a memory device including peripheral circuits and an array of memory cells, according to some aspects of the present disclosure.

FIG. 1 illustrates a schematic diagram of a memory device 100 including peripheral circuits 102 and an array of memory cells 101, according to some aspects of the present disclosure. In some implementations as shown in FIG. 1, each memory cell 103 may include a transistor 105 and a capacitor 107. The gate of transistor 105 may be coupled to word line 104, one of the source and the drain of transistor 105 may be coupled to bit line 106, the other one of the source and the drain of transistor 105 may be coupled to one electrode of capacitor 107, and the other electrode of capacitor 107 may be coupled to the ground. Additional details of a memory device are provided below in connection with FIG. 11.

Figure 2:
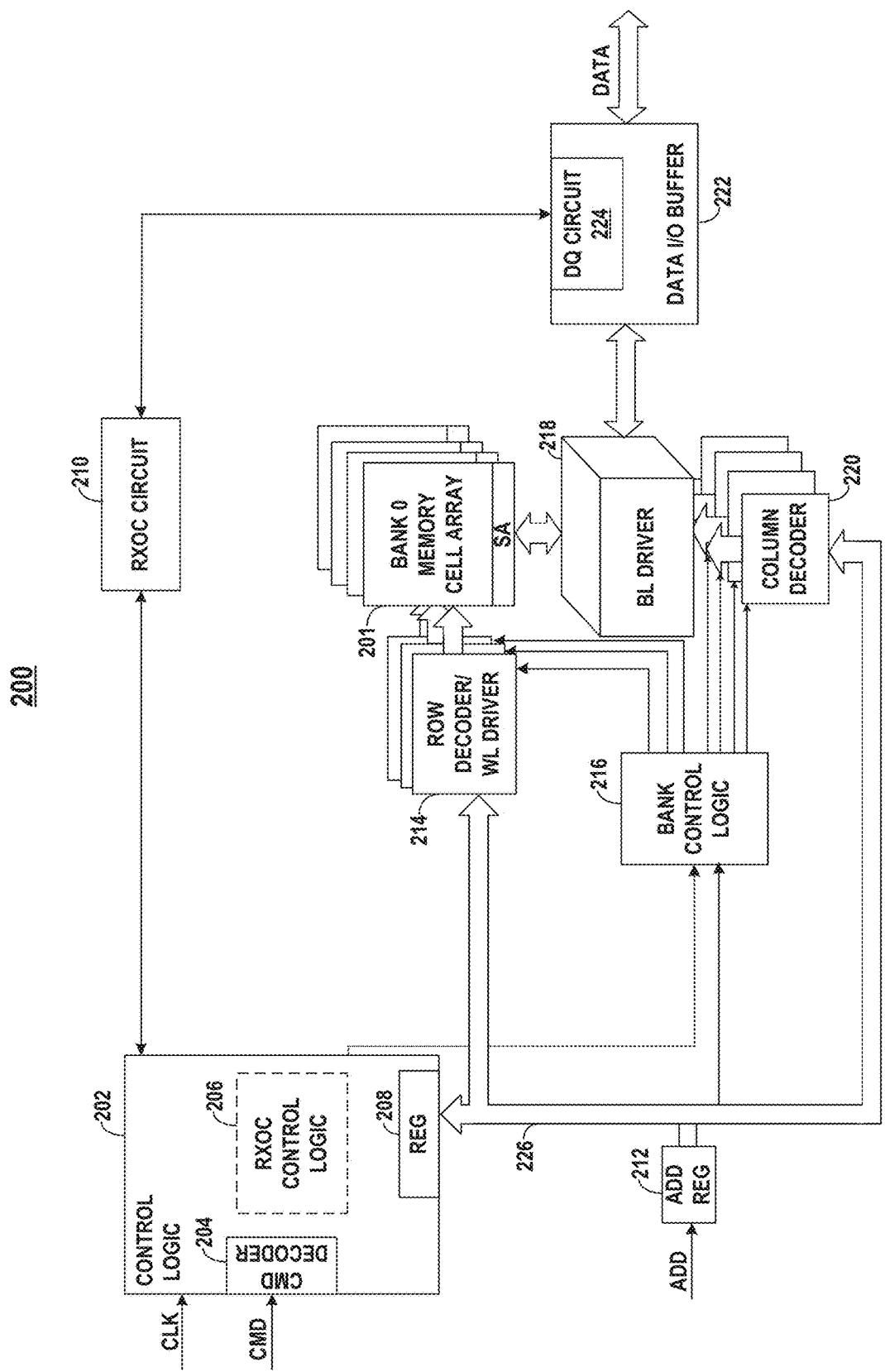
FIG. 2 illustrates a block diagram of a memory system including a memory array coupled to an example resistor-offset calibration (RXOC) component and control logic, according to some aspects of the present disclosure.

Referring to FIG. 2, a schematic circuit diagram of an example memory device 200 including peripheral circuits is illustrated according to some aspects of the present disclosure. As described above, the peripheral circuits can be coupled to at least two memory cell arrays and can include any suitable circuits for facilitating the operations of the at least two memory cell arrays by applying and sensing voltage signals and/or current signals to and from each target memory cell of the at least two memory cell arrays. The peripheral circuits can include various types of peripheral circuits formed using CMOS technologies, e.g., such as an RXOC circuit.

For example, FIG. 2 illustrates memory device 200 including a memory cell array 201 with one or more memory banks, and various example periphery circuits including control logic 202, a command (CMD) decoder 204, RXOC control logic 206, registers 208, an RXOC circuit 210, an address (ADD) register 212, a WL driver 214 (also referred to as row decoder(s)), memory bank control logic 216, a BL driver 218 (also referred to a row decoder(s)), a column decoder 220, a data I/O buffer 222, a DQ circuit 224, and an interface 226. It is understood that in some examples, additional periphery circuits may be included as well.

WL driver 214 can be configured to be controlled by control logic 202 and select the bank of memory cell array 201 and a word line of the selected bank. WL driver 214 can be further configured to drive memory cell array 201. For example, WL driver 214 may drive NAND memory cells and/or DFM cells of memory cell array 201 coupled to the selected word line using a word line voltage generated from a voltage generator (not shown).

BL driver 218 can be configured to be controlled by control logic 202 and select one or more 3D NAND memory strings and/or one or more 3D DFM cells of memory cell array 201 by applying bit line voltages generated from the voltage generator (not shown). For example, BL driver 218 may apply column signals for selecting a set of N bits of data from a page buffer (now shown) to be output in a read operation.

Control logic 202 can be coupled to each of the plurality of peripheral circuits and configured to control operations of the plurality of peripheral circuits. Registers 208 can be coupled to control logic 202 and include status registers, command registers, and address registers for storing status information, command operation codes (OP codes), and command addresses for controlling the operations of each of peripheral circuits.

Command decoder 204 may decode incoming command signal(s) to identify a corresponding command operation. An indication of the command operation may be sent to registers 208, which may identify associated OP code(s) and/or command address(es). The OP code(s) and/or command address(es) may be identified by comparing the identified command operation to a look-up table of OP code(s) and/or command address(es).

Interface 226 can be coupled to control logic 202 and configured to interface memory cell array 201 with one or more memory controllers (not shown). In some implementations, interface 226 acts as a control buffer to buffer and relay control commands received from the one or more memory controllers and/or a host (not shown) to control logic 202 and status information received from control logic 202 to the memory controller and/or the host. Interface 226 can also be coupled to page buffer(s) (not shown), and BL driver 218 via a data bus (not shown) and act as an I/O interface and a data buffer to buffer and relay the program data received from the one or more memory controllers and/or the host to page buffers, and the read data from the page buffers to the one or more memory controllers and/or the host. In some implementations, interface 226 and the data bus (not shown) are parts of an I/O circuit of the peripheral circuits.

The voltage generator (not shown) can be configured to be controlled by control logic 202 and generate the word line voltages (e.g., read voltage, program voltage, pass voltage, local voltage, and verification voltage) and the bit line voltages to be supplied to memory cell array 201. In some implementations, the voltage generator is part of a voltage source that provides voltages at various levels of different peripheral circuits as described below in detail. Consistent with the scope of the present disclosure, in some implementations, the voltages provided by the voltage generator, for example, to WL driver 214 and BL driver 218, are above certain levels that are sufficient to perform the memory operations. For example, the voltages provided to the logic circuits in control logic 202 may be between 1.3 V and 5 V, such as 3.3 V, and the voltages provided to the driving circuits in WL driver 214 BL driver 218 may be between 5 V and 30 V.

RXOC circuit 210 can be coupled to control logic 202 and include an oscillator (see FIG. 4), a DQ-selection component (see FIG. 4), and RXOC control logic 206. In some implementations, RXOC control logic 206 may be part of control logic 202. In some other implementations, RXOC control logic 206 may be separate from control logic 202. The oscillator may be configured to generate an internal clock source for, e.g., RXOC control logic 206, the DQ-selection component (see FIG. 4), and DQ circuit 224 (see FIG. 5), just to name a few. By setting the internal clock source for RXOC control logic 206, the DQ-selection component, and the DQ circuit 224, synchronous calibration of the peripheral circuit can be realized.

RXOC training involves calculating the resistance of a DQ circuit, e.g., namely, a determination of how many transistors are opened or closed. For example, a clock source is used to time the operations performed by the RXOC control logic and the DQ-selection component. Traditional RXOC uses a full-rate write clock (WCK) as clock source. To perform RXOC using a full-rate write clock, an additional column address strobe (CAS) command (CMD) (CAS CMD) is needed before the training can begin. Alternatively, a WCK-to-clock (WCK2CK) synchronization state from previous operation is needed. However, due to the undesirably large WCK frequency range (e.g., from 3200 Mhz to 20 Mhz), various challenges in designing an RXOC circuit arise. These shortcomings of the existing RXOC procedure are illustrated in the signal-timing diagram 300 for of FIG. 3.

Figure 3:
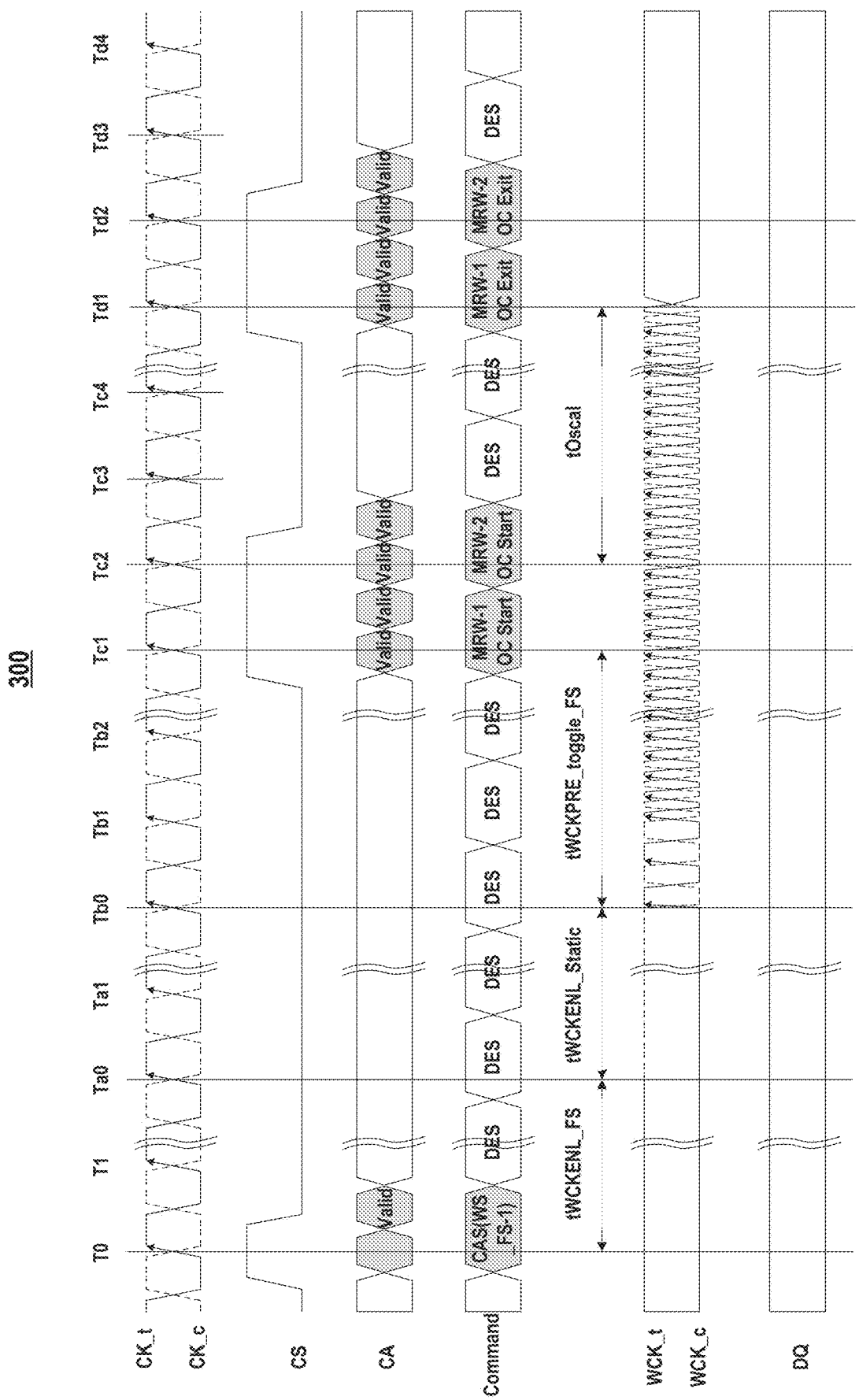
FIG. 3 illustrates a signal-timing diagram for an example RXOC procedure.

Referring to FIG. 3, a CAS command is issued at time T0, and WCK2CK synchronization is performed during time T0–Tc1, while the WCK is toggled at a full-rate. Then, an offset Cal_Start CMD is issued at time Tc1. This initiates RXOC training, which is performed at time Tc2–Td1. After time Td1, an exist offset calibration signal is sent. The RXOC procedure is complete after tOSCAL, e.g., 3 μs. Then, the device exits the RXOC procedure. As mentioned above, an additional circuit for WCK of different frequencies is needed for the existing RXOC procedure. For instance, when the WCK frequency is high, an under-clock operation is needed. On the other hand, when the WCK frequency is low, each DQ uses a separate RXOC circuit to meet timing requirements and/or reduce the calibration accuracy.

To address one or more of the aforementioned issues, the present disclosure provides an example full-synchronization RXOC training strategy. For example, an example internal clock source is provided in the RXOC circuit to synchronize timing of the DFE-selection component and the RXOC control logic. In other words, the example RXOC circuit described herein includes an oscillator (e.g., an internal clock source), RXOC control logic, and a DFE-selection component (e.g., one or more multiplexers (MUX(s)). The DFE-selection component selects a DFE component from a plurality of DFE components (e.g., DQ circuits) of the RXOC circuit. Then, the DFE-selection component selects a slicer-offset result from a plurality of slicer-offset results of the selected DFE component. The RXOC control logic implements a binary search for RXOC calibration. By including a local oscillator in the RXOC circuit, the use of a CAS command and/or synchronization states from previous operations are eliminated. Moreover, using a local oscillator to synchronize the operations of the DFE-selection component and the RXOC control logic reduces the silicon footprint of the RXOC circuit and improves the stability of calibration, while simplifying the RXOC control logic's operation. Additional details of the example RXOC circuit are provided below in connection with FIGS. 4-11.

Figure 4:
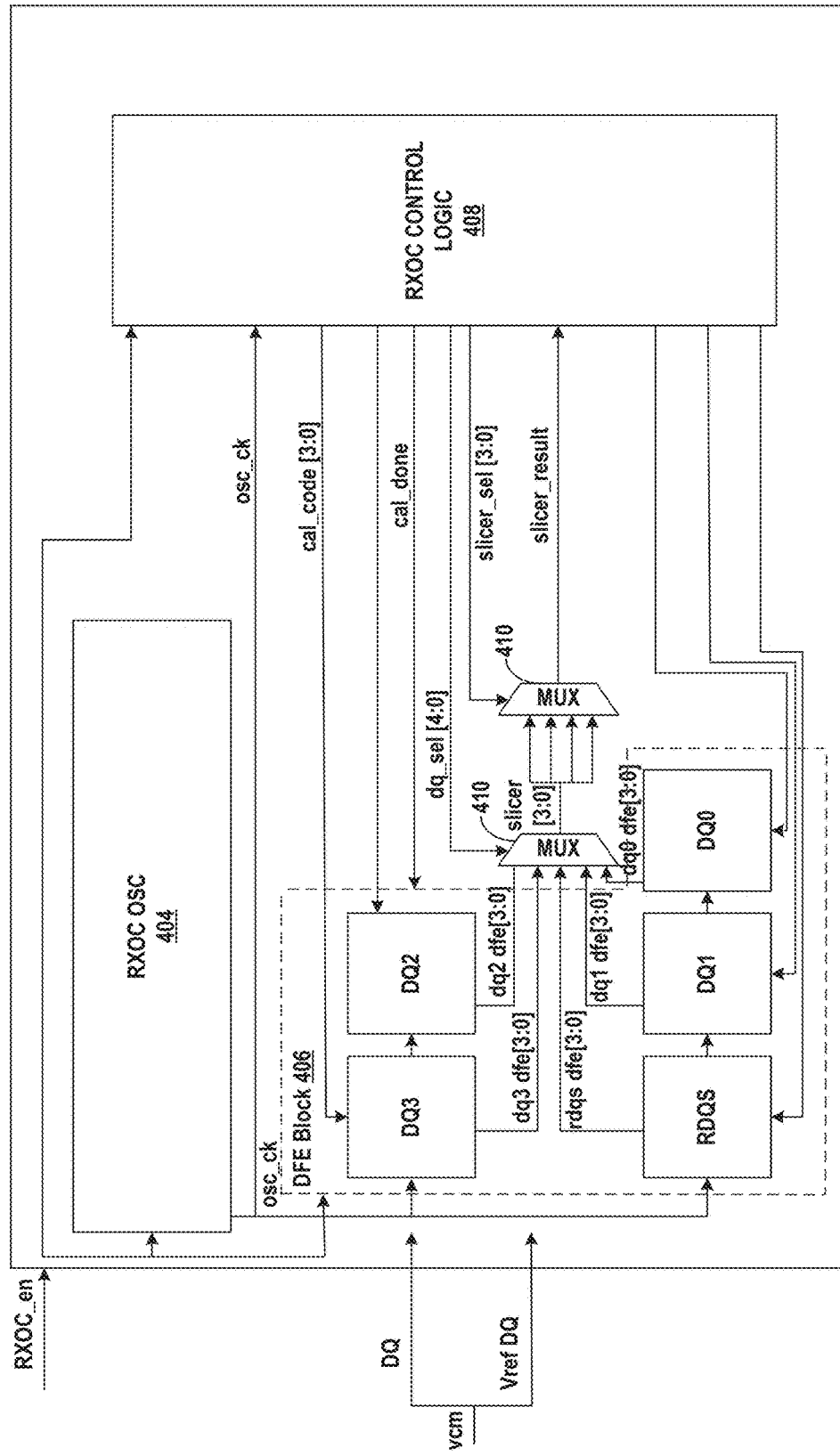
FIG. 4 illustrates a detailed block diagram of an example peripheral circuit that includes an RXOC circuit and a plurality of DQ circuits, according to some aspects of the present disclosure.
Figure 5:
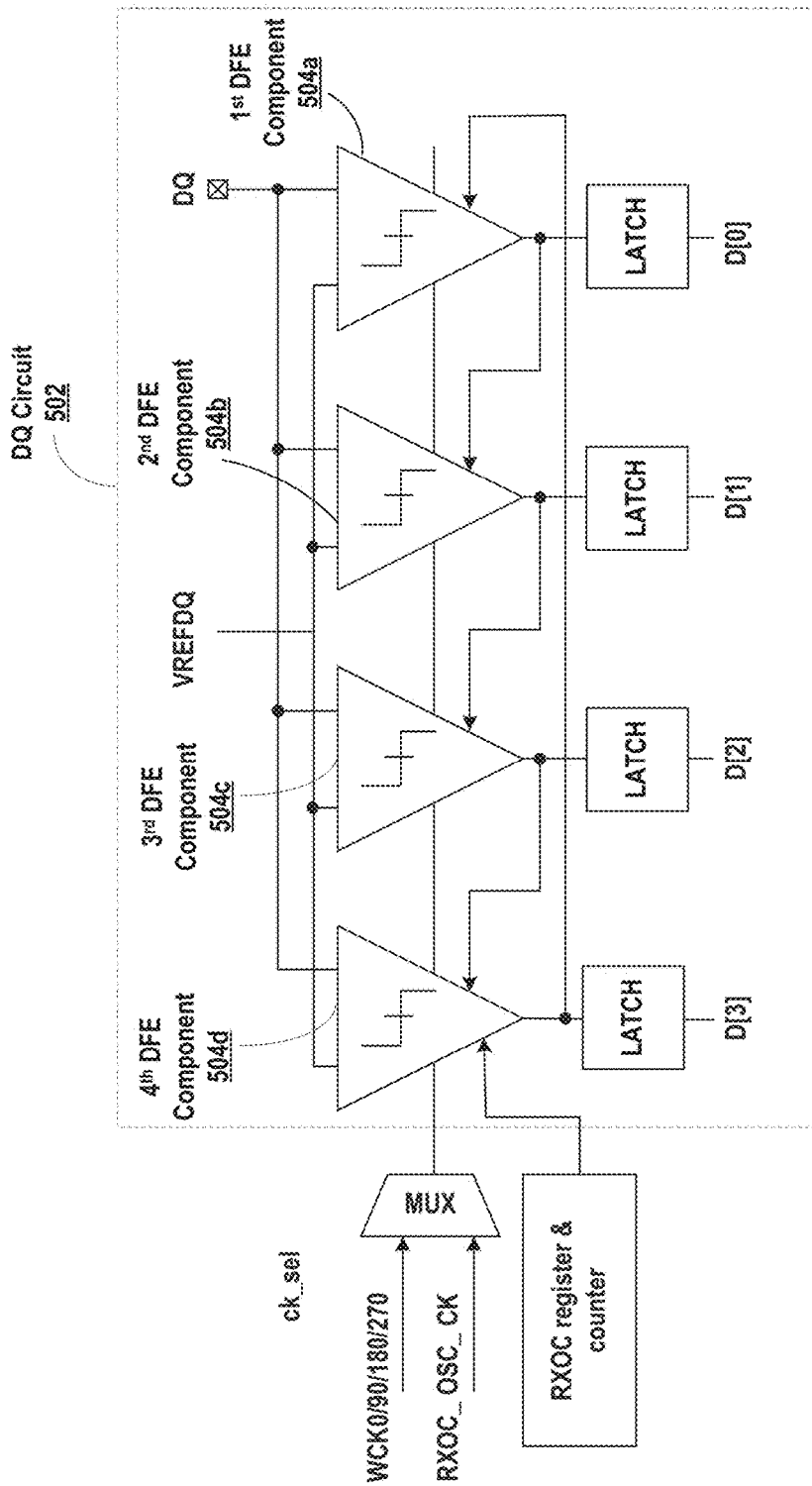
FIG. 5 illustrates a block diagram of an example DQ circuit, according to some aspects of the present disclosure.
Figure 6:
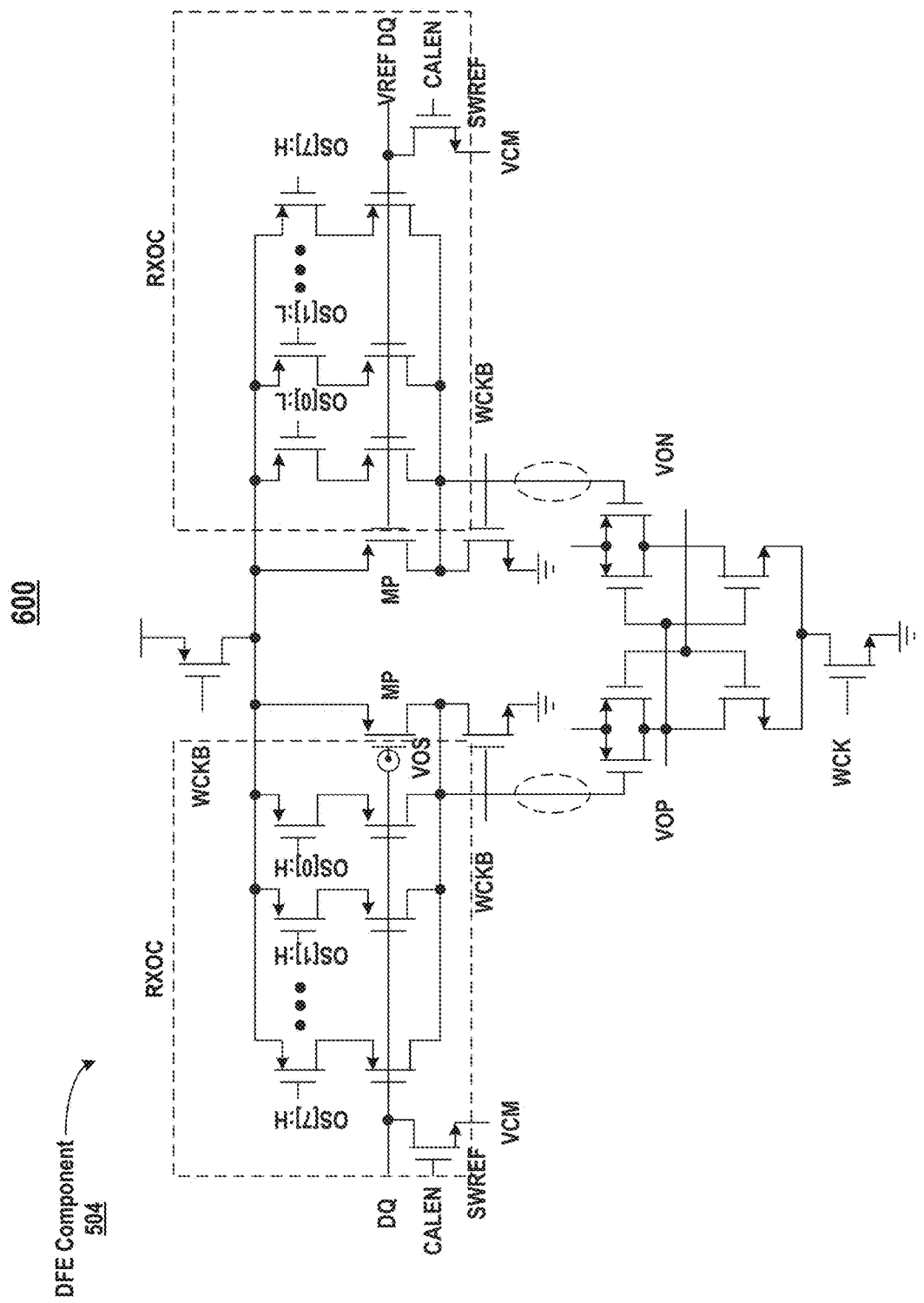
FIG. 6 illustrates a diagram of a DFE component of the example DQ circuit depicted in FIG. 5, according to some aspects of the present disclosure.
Figure 7:
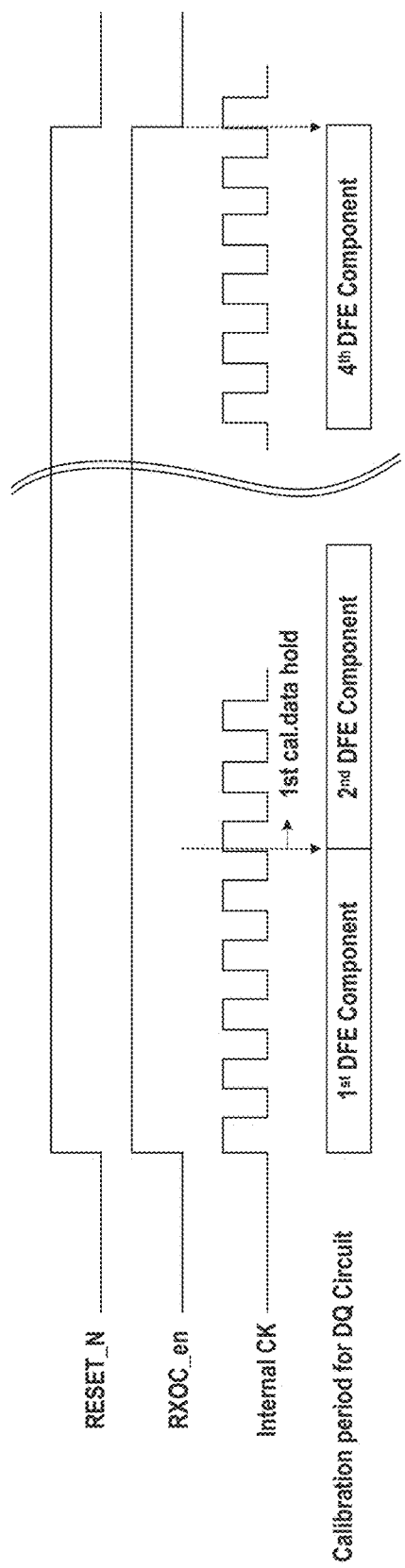
FIG. 7 illustrates a first example signal-timing diagram for an example RXOC procedure, according to some aspects of the present disclosure.
Figure 8:
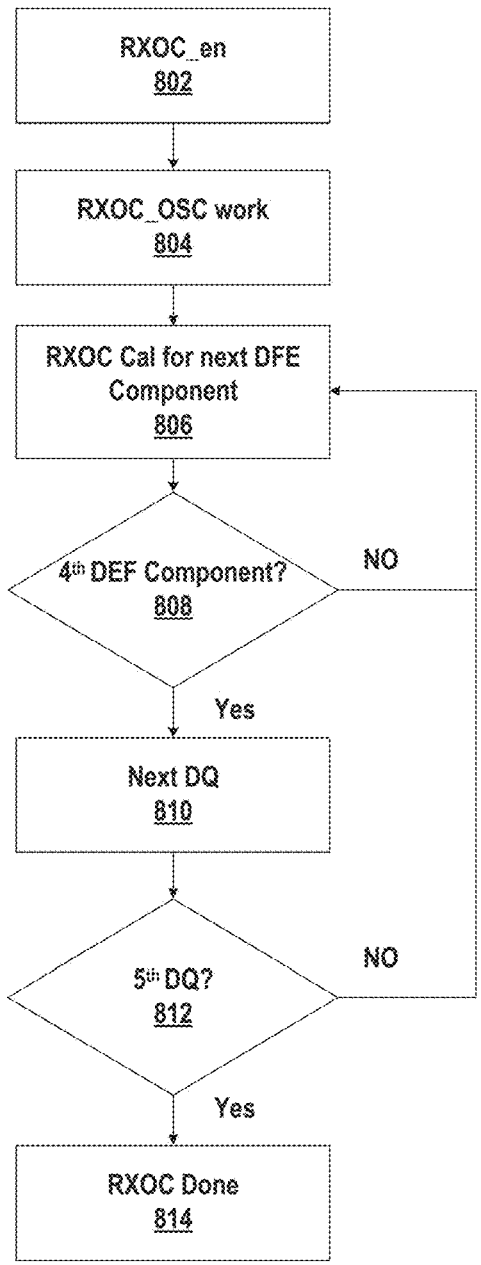
FIG. 8 illustrates a flowchart of a first method of an RXOC procedure, according to some aspects of the present disclosure.
Figure 9:
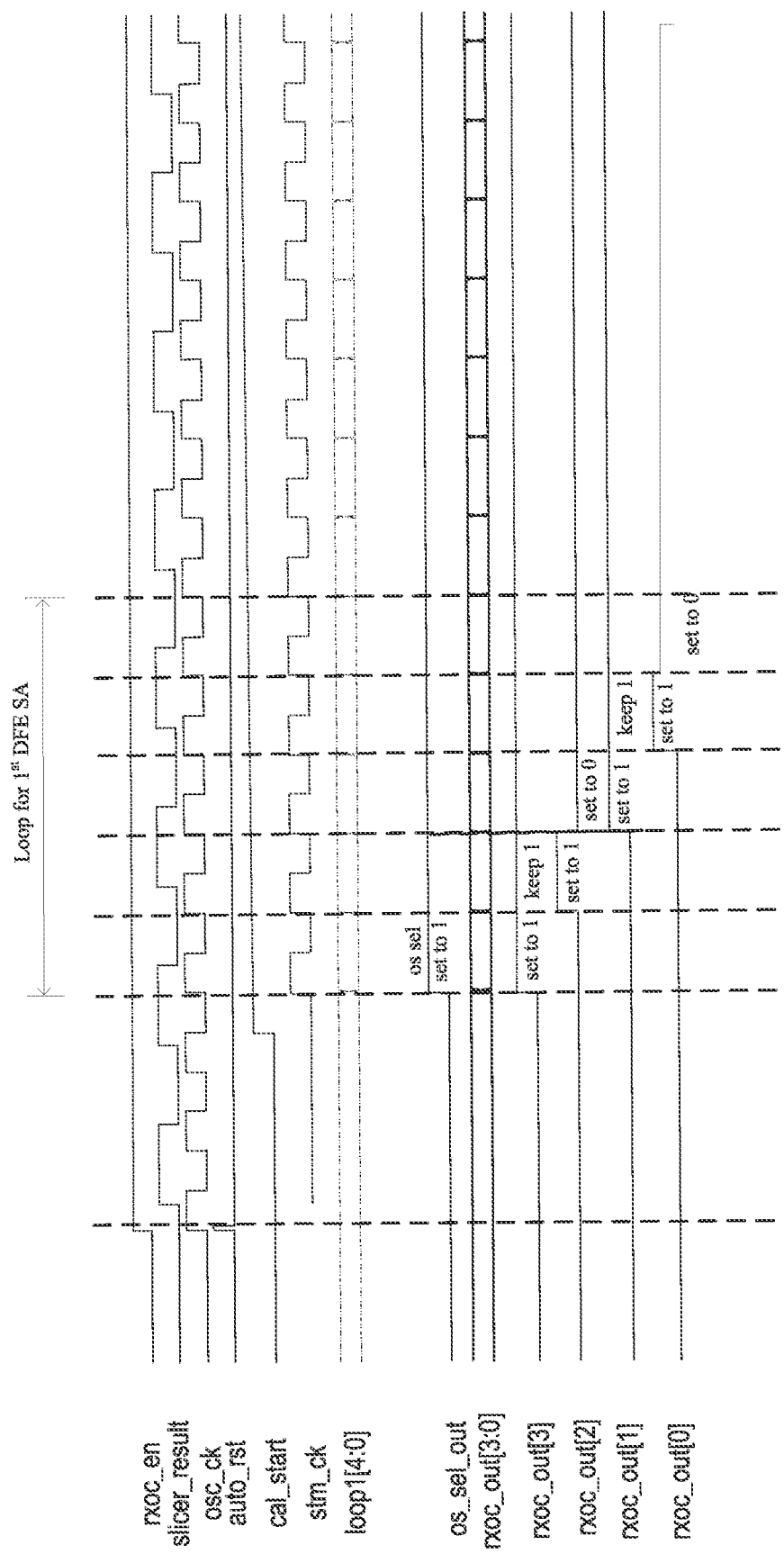
FIG. 9 illustrates a second example signal-timing diagram for an example RXOC procedure, according to some aspects of the present disclosure.

FIG. 4 illustrates a detailed block diagram 400 of an example peripheral circuit that includes an RXOC circuit and a plurality of DQ circuits, according to some aspects of the present disclosure. FIG. 5 illustrates a block diagram 500 of an example DQ circuit 502, according to some aspects of the present disclosure. FIG. 6 illustrates a diagram 600 of a DFE component 504 of the example DQ circuit 502 depicted in FIG. 5, according to some aspects of the present disclosure. FIG. 7 illustrates a first example signal-timing diagram 700 for an example RXOC procedure for calibrating a DQ circuit, according to some aspects of the present disclosure. FIG. 8 illustrates a flowchart of a first method 800 of an RXOC procedure, according to some aspects of the present disclosure. FIG. 9 illustrates a second example signal-timing diagram 900 for an example RXOC procedure, according to some aspects of the present disclosure. FIGS. 4, 5, and 8 will be described together.

Referring to FIG. 4, the RXOC circuit may include, e.g., an RXOC oscillator 404 (referred to hereinafter as "oscillator 404") and RXOC control logic 408. The plurality of DQ circuits may be included in DFE block 406. By way of example and not limitation, DFE block 406 (e.g., DQ circuit 224 in FIG. 2 may correspond to DFE block 406 in FIG. 4) is shown with four DQ circuits (e.g., DQ0, DQ1, DQ2, DQ3) and one RDQS circuit. However, DFE block 406 may include more or fewer than four DQ circuits and more or fewer than one RDQS circuit without departing from the scope of the present disclosure. The DFE-selection component 410 may include a first MUX (e.g., left-most MUX) configured to select a DQ circuit of DFE block 406 for calibration. Moreover, the DFE-selection component 410 may include a second MUX (e.g., right-most MUX) configured to select a DFE of the DQ circuit selected by the first MUX for calibration. In FIG. 4, the DQ signal being input into the DFE block 406 may be the I/O data though the DQ pins of a memory device. For instance, the DQ signal may be transmitted from the memory controller through an I/O buffer and then into the memory device. During RXOC calibration, the ports for the DQ signal and Vref DQ shown on the lefthand side of FIG. 4 may be shorted.

Referring to FIGS. 4 and 8, RXOC operations may begin when an RXOC-engage (RXOX_en) signal is received (at 802). Once the RXOC_en signal is received, oscillator 404 may generate (at 804) an internal clock source (osc_ck) with a predetermined frequency, which is sent to DFE block 406 and RXOC control logic 408 to synchronize their respective operations. In the following example, assume that the RXOC procedure is performed in the order of DQ0, DQ1, DQ2, DQ3, and RDQS, and that each of these DQ circuits includes four DFE components.

For example, referring to FIGS. 4, 5, and 8, RXOC control logic 408 may perform (at 806) an RXOC procedure to calibrate first DFE component 504a of DQ circuit 502 (e.g., DQ0). Additional details of DQ circuit 502 are illustrated in FIG. 5, while additional details of first DFE component 504a (which may be the same or similar structure as the other DFE components) are illustrated in FIG. 6.

Referring to FIGS. 4 and 5, to perform the RXOC procedure, the first MUX may select DQ0 and the second MUX may select first DFE component 504a of DQ0 for calibration. In some implementations, RXOC control logic 408 may send a DQ-select (dq_sel) signal to the first MUX and a slicer-select (slicer_sel) signal to the second MUX. The dq_sel signal may indicate which DQ circuit (e.g., DQ0, DQ1, DQ2, DQ3, RDQS, etc.) of DFE block 406 is selected for calibration. The slicer_sel signal may indicate which DFE component (e.g., first DFE component 504a, second DFE component 504b, third DFE component 504c, or fourth DFE component 504d) of the selected DQ circuit is selected for calibration. Each DFE component may identify a slicer result signal, which is sent to the first MUX. The first MUX may output slicer result signals from DFE components of the selected DQ circuit. In the present example, the first MUX may output the slicer result signals from the DFE components of DQ0. The second MUX may output a slicer result signal that indicates an offset value (e.g., resistance offset value, voltage offset value, current offset value, etc.) associated with the selected DFE component of DQ0. RXOC control logic 408 may receive the slicer result signal at the rising edge or the falling edge of the first clock cycle.

RXOC control logic 408 may perform a binary search based on the slicer result (e.g., the offset value) to identify a pull-up code or a pull-down code for the selected DFE component. The pull-up code or the pull-down code may be used to calibrate the selected DFE component, e.g., namely, how many MOSFETs are open or closed (see FIG. 6). For instance, referring to FIG. 6, using the pull-up code or the pull-down code to calibrate the selected DFE component, the current difference between the left dashed box and the right dashed box may be minimized. To perform the binary search, RXOC control logic 408 may identify a target code, e.g., 0101. Using a non-limiting example target code of 0101, RXOC control logic may determine a minus by comparing 0101 to 1000. Then, RXOC control logic 408 may determine a plus by comparing 0101 to 0100. Next, RXOC control logic 408 may determine a minus by comparing 0101 to 0110. Finally, RXOC control logic may determine the binary search is finished by comparing 0101 to 0101. Additional details of the binary search performed by RXOC control logic 408 are described below in connection with FIGS. 4 and 9.

For example, referring to FIGS. 4 and 9, the RXOC control logic 408 sets all RXOC code to 0. Then, the RXOC control logic 408 sets all pull-up codes and pull-down codes are set to 0. Based on the slicer result signal received from the DQ-selection component, the RXOC control logic 408 may determine how to change the pull-up code. Then, at the rising edge of the clock cycle, the RXOC control logic 408 may set the pull-up code to 1000. At the falling edge of the clock cycle, the RXOC control logic may perform a slicer operation. Then, the RXOC control logic 408 may perform a code judgement to determine whether to keep the code as 1 or set it to 0. This may be performed for each of the bits in the code (e.g., two bits, three bits, four bits, etc.). This loop is performed until all four bits have been judged for the slicer result signal. Then, the calibration code (e.g., pull-up code or pull-down code) may be sent to the selected DFE component/DQ circuit. Additional details of the calibration procedure are described below in connection with FIG. 7.

Referring to FIG. 7, five clock pulses generated by oscillator 404 are associated with the calibration of one DFE component. The first clock pulse may be used to indicate whether the transistors in the left dashed box or the right dashed box shown in FIG. 6 are being calibrated. Then, each of the subsequent clock pulses may be associated with the calibration of one bit of the pull-up code or the pull-down code. For instance, referring to FIGS. 4, 6, and 7, at the first clock pulse, RXOC control logic 408 may indicate whether the transistors in the left dashed box or the right dashed box in FIG. 6 are being calibrated. At the second clock pulse, RXOC control logic 408 may calibrate a first bit of the pull-up code or the pull-down code (e.g., corresponding to the dashed box indicated at the first pulse). At the third clock pulse, RXOC control logic 408 may calibrate a second bit of the pull-up code or the pull-down code. At the fourth clock pulse, RXOC control logic 408 may calibrate a third bit of the pull-up code or the pull-down code. Finally, at the fifth clock pulse, RXOC control logic 408 may calibrate the fourth bit of the pull-up code or the pull-down code.

Referring again to FIG. 4, RXOC control logic 408 may generate a calibration signal that includes the pull-up code or the pull-down code to DQ0. The calibration signal may be sent to DQ0 at the other of the rising edge or the falling edge of the first clock cycle. For example, if the slicer result signal is received at the rising edge of the first clock cycle, the calibration signal may be sent at the falling edge of the first clock cycle. Otherwise, if the slicer result signal is received at the falling edge of the first clock cycle, the calibration signal may be sent at the rising edge of the first clock cycle. Each DFE component may calibrate multiple bits, e.g., four bits; and each pulse of a clock cycle may be used to calibrate one bit.

Referring again to FIGS. 4, 5, and 8, RXOC control logic 408 may determine (at 808) whether the fourth DFE component 504*d* of DQ0 was calibrated in the previous operation (e.g., 806). If "No" at 808, the operations may return to 806, where the RXOC control logic 408 performs the above-described procedure for calibrating, e.g., second DFE component 504*b* of DQ0. Otherwise, if "Yes" at 808, the operations may move to 810, RXOC control logic 408 may perform (at 810) the RXOC procedure for DQ1. That is, operation 810 may include calibrating each of the four DFE components of DQ1. Once DQ1 is calibrated, RXOC control logic 408 may determine (at 812) whether all five DQ circuits (e.g., DQ0, DQ1, DQ2, DQ3, and RDQS) are calibrated. If "No" at 812, the operations may return to 806, where the above-described RXOC procedure is performed for the next DQ circuit and/or the next DFE component of the same or different DQ circuit. Otherwise, if "Yes" at 812, the RXOC procedure for DFE block 406 may conclude (at 814). Additional details of the operations of FIG. 8 are provided below in connection with FIGS. 4, 5, and 9.

Referring to FIGS. 4, 5, and 9, in a non-limiting example, a DQ circuit may include five DQs, and each DQ may include four slicers (e.g., DFE components). As mentioned above, the timing diagrams shown in FIGS. 5 and 9 are associated with the calibration of four bits of a pull-up or pull-down code. Referring to FIG. 9, at the rising edge of the stm_ck cycle (e.g., generated by oscillator 404), RXOC control logic 406 outputs the calibration code according to the slicer_result of a four-bit calibration. In a DFE loop, there are five clock pulses (e.g., the dotted line in FIG. 9 represents the position of the rising edge), the first clock pulse selects the os, e.g., namely, the left dash box or the right dash box in FIG. 6. At the first rising edge of the first clock pulse, os_sel_out outputs a high-level signal (set to 1). Still referring to FIG. 9, rxoc_out[0]-rxoc_out[3] represents the calibration results output by performing the above-described binary search according to the slicer_result of each bit. In the non-limiting example depicted in FIG. 9, rxoc_out[3] rises to a high level (set to 1) at the rising edge of the first clock pulse, and keeps at the high level (keep 1) at the rising edge of the second clock pulse. At the rising edge of the second clock pulse, rxoc_out[2] rises to a high level (set to 1), and falls to a low level (set to 0) at the rising edge of the third clock pulse. At the rising edge of the third clock pulse, rxoc_out[1] rises to the high level (set to 1), and keeps at the high level (keep 1) at the rising edge of the fourth clock pulse. At the rising edge of the fourth clock pulse, rxoc_out[0] rises to the high level (set to 1), and falls to the low level (set to 0) at the rising edge of the fifth pulse. It is understood that the example target code 0101 and the calibrated target code 1010 are provided herein by way of example and not limitation. Other target codes and calibrated target codes may be used and/or achieved without departing from the scope of the present disclosure.

Figure 10:
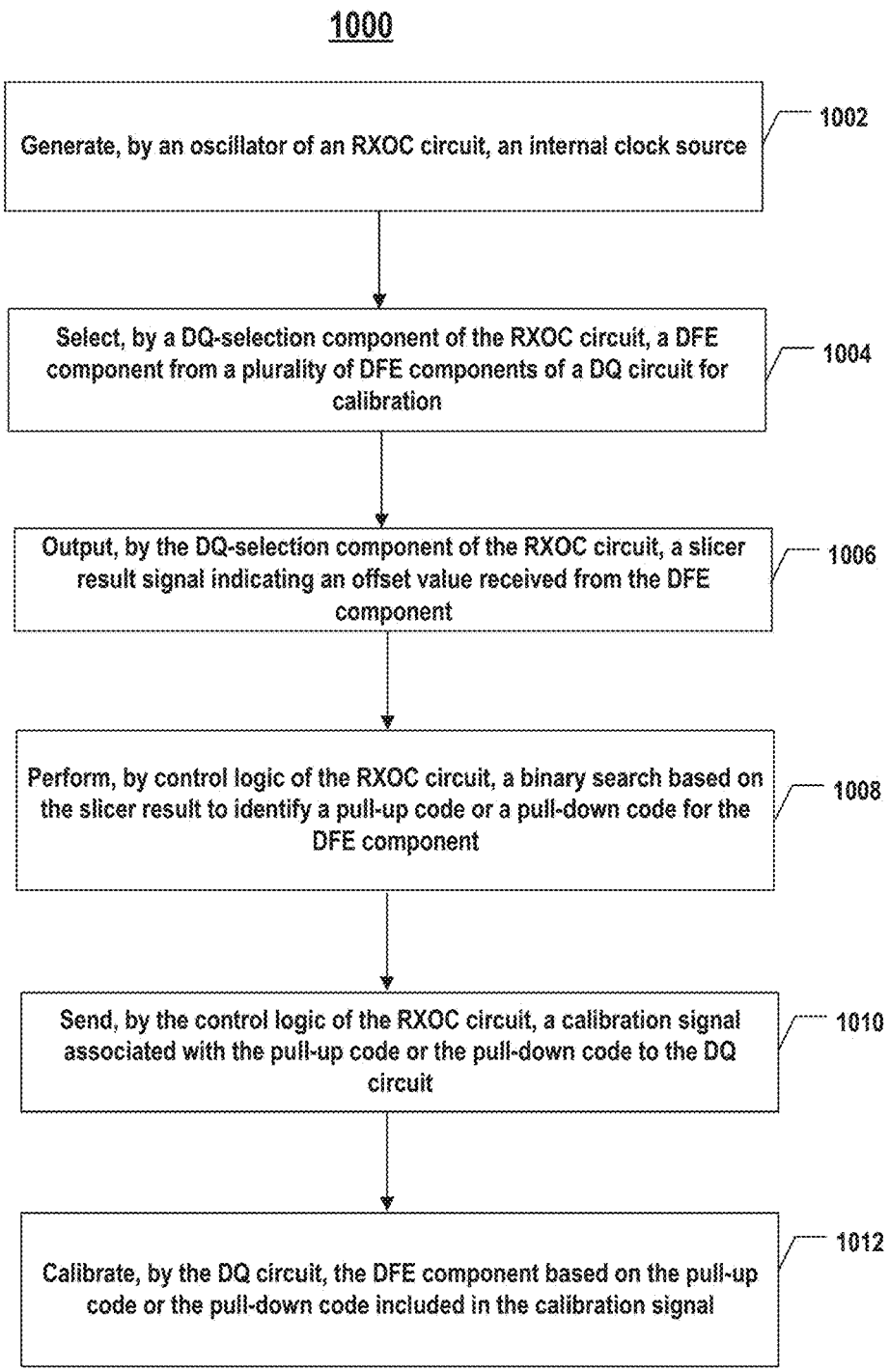
FIG. 10 illustrates a flowchart of a second method of an RXOC procedure, according to some aspects of the present disclosure.

FIG. 10 illustrates a flowchart of a method 1000 for operating a memory device including peripheral circuits, according to some aspects of the present disclosure. The memory device may be any suitable memory device disclosed herein, such as memory device 100. Method 1000 may be implemented by a peripheral circuit including the RXOC circuit and DQ circuit. The internal circuitry of the peripheral circuit may include, e.g., one or more of oscillator 404, DFE block 406, one or more of the DQ circuits of DFE block 406, one or more DFE components of a DQ circuit, RXOC control logic 408, and/or DQ-selection component 410. It is understood that the operations shown in method 1000 may not be exhaustive and that other operations can be performed as well before, after, or between any of the illustrated operations. Further, some of the operations may be performed simultaneously, or in a different order than shown in FIG. 10.

Referring to FIG. 10, at 1002, an oscillator of an RXOC circuit may generate an internal clock source. For example, referring to FIG. 4, once the RXOC_en signal is received from outside the RXOC circuit, oscillator 404 may generate (at 804) an internal clock source (osc_ck) with a predetermined frequency, which is sent to DFE block 406 and RXOC control logic 408 to synchronize their respective operations.

At 1004, a DQ-selection component of the RXOC circuit, may select a DFE component from a plurality of DFE components of a DQ circuit for calibration. For example, referring to FIG. 4, to perform the RXOC procedure, the first MUX may select DQ0 and the second MUX may select first DFE component 504a of DQ0 for calibration. In some implementations, RXOC control logic 408 may send a DQ-select (dq_sel) signal to the first MUX and a slicer-select (slicer_sel) signal to the second MUX.

At 1006, the DQ-selection component of the RXOC circuit may output a slicer result signal indicating an offset value received from the DFE component. For example, referring to FIG. 4, in the above example, the first MUX may output the slicer result signals from the DFE components of DQ0. The second MUX may output a slicer result signal that indicates an offset value (e.g., resistance offset value, voltage offset value, current offset value, etc.) associated with the selected DFE component of DQ0.

At 1008, control logic of the RXOC circuit may perform a binary search based on the slicer result signal to identify a pull-up code or a pull-down code for the DFE component. For example, referring to FIG. 4 RXOC control logic 408 may perform a binary search based on the slicer result signal to identify a pull-up code or a pull-down code for the selected DFE component. To perform the binary search, RXOC control logic 408 may identify a target code, e.g., 0101. Using a non-limiting example target code of 0101, RXOC control logic may determine a minus by comparing 0101 to 1000. Then, RXOC control logic 408 may determine a plus by comparing 0101 to 0100. Next, RXOC control logic 408 may determine a minus by comparing 0101 to 0110. Finally, RXOC control logic may determine the binary search is finished by comparing 0101 to 0101.

At 1010, the control logic of the RXOC circuit may send a calibration signal associated with the pull-up code or the pull-down code to the DQ circuit. For example, referring to FIG. 4, RXOC control logic 408 may generate a calibration signal that includes the pull-up code or the pull-down code to DQ0. The calibration signal may be sent to DQ0 at the other of the rising edge or the falling edge of the first clock cycle. For example, if the slicer result signal is received at the rising edge of the first clock cycle, the calibration signal may be sent at the falling edge of the first clock cycle. Otherwise, if the slicer result signal is received at the falling edge of the first clock cycle, the calibration signal may be sent at the rising edge of the first clock cycle.

At 1012, the DQ circuit may calibrate the DFE component based on the pull-up code or the pull-down code included in the calibration signal. For example, referring to FIG. 4, DQ0 may calibrate first DFE component 504a based on the pull-up code or the pull-down code included in the calibration signal. For instance, the pull-up code or the pull-down code may be used to calibrate the selected DFE component (e.g., first DFE component 504a), e.g., namely, how many MOSFETs are open or closed (see FIG. 6). For instance, referring to FIG. 6, using the pull-up code or the pull-down code to calibrate the selected DFE component, the current difference between the left dashed box and the right dashed box may be minimized. For example, referring to FIGS. 4 and 9, the RXOC control logic 408 sets all RXOC code to 0. Then, the RXOC control logic 408 sets all pull-up codes and pull-down codes are set to 0. Based on the slicer result signal received from the DQ-selection component, the RXOC control logic 408 may determine how to change the pull-up code. Then, at the rising edge of the clock cycle, the RXOC control logic 408 may set the pull-up code to 1000. At the falling edge of the clock cycle, the RXOC control logic may perform a slicer operation. Then, the RXOC control logic 408 may perform a code judgement to determine whether to keep the code as 1 or set it to 0. This may be performed for each of the bits in the code (e.g., two bits, three bits, four bits, etc.). This loop is performed until all four bits have been judged for the slicer result signal. Then, the calibration code (e.g., pull-up code or pull-down code) may be sent to the selected DFE component/DQ circuit. Additional details of the calibration procedure are described below in connection with FIG. 7. Referring to FIG. 7, five pulses generated by oscillator 404 are associated with the calibration of one DFE component. The first pulse may be used to indicate whether the transistors in the left dashed box or the right dashed box shown in FIG. 6 are being calibrated. Then, each of the subsequent pulses may be associated with the calibration of one bit of the pull-up code or the pull-down code. For instance, referring to FIGS. 4, 6, and 7, at the first pulse, RXOC control logic 408 may indicate whether the transistors in the left dashed box or the right dashed box in FIG. 6 are being calibrated. At the second pulse, RXOC control logic 408 may calibrate a first bit of the pull-up code or the pull-down code (e.g., corresponding to the dashed box indicated at the first pulse). At the third pulse, RXOC control logic 408 may calibrate a second bit of the pull-up code or the pull-down code. At the fourth pulse, RXOC control logic 408 may calibrate a third bit of the pull-up code or the pull-down code. Finally, at the fifth pulse, RXOC control logic 408 may calibrate the fourth bit of the pull-up code or the pull-down code.

Figure 11:
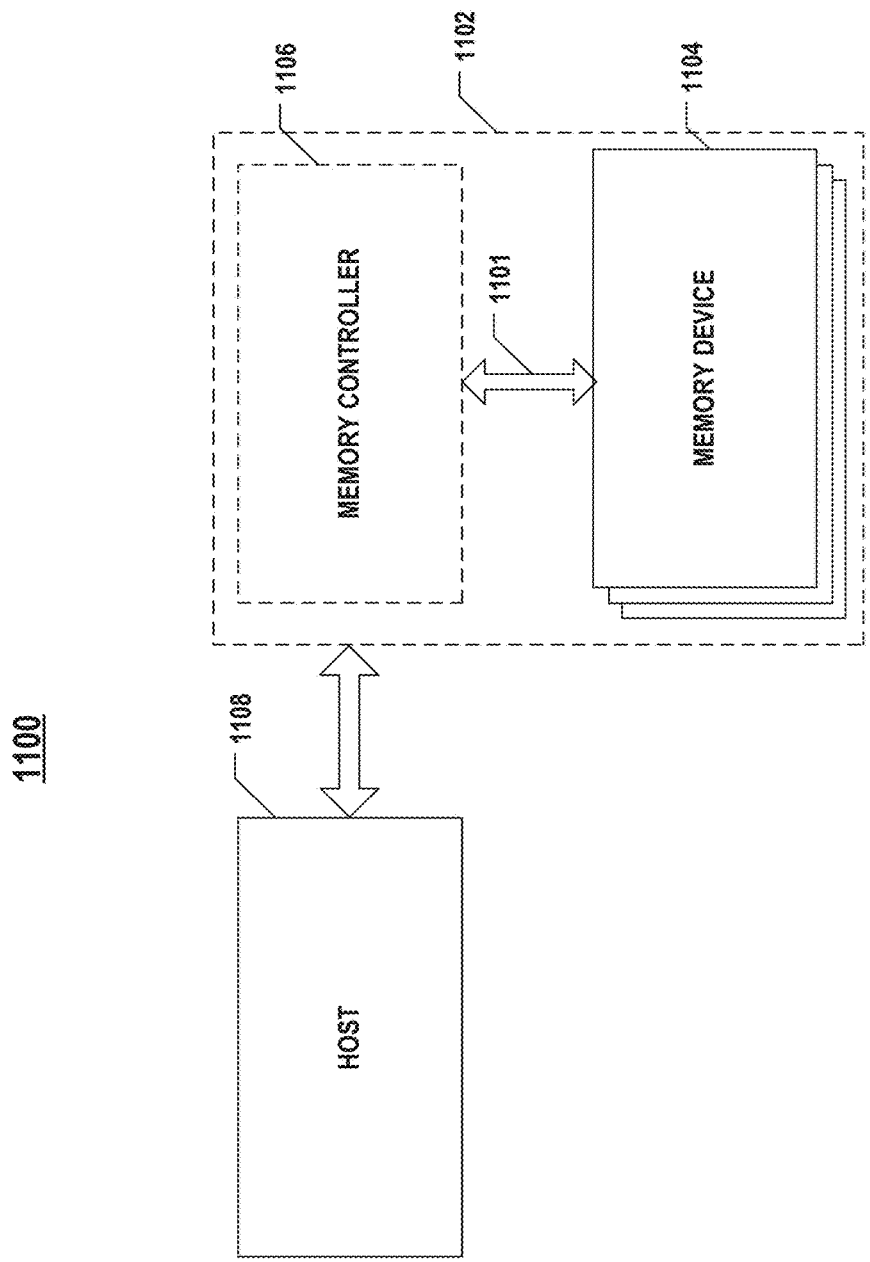
FIG. 11 illustrates a block diagram of a system including a memory system, according to some aspects of the present disclosure.

FIG. 11 illustrates a block diagram of a system 1100 including a memory system 1102, according to some aspects of the present disclosure. System 1100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 11, system 1100 can include a host 1108 and memory system 1102 having one or more memory devices 1104 and a memory controller 1106. Host 1108 can be a processor of an electronic device, such as a central processing unit (CPU), or a system-on-chip (SoC), such as an application processor (AP). Host 1108 can be configured to send or receive data (a.k.a. user data or host data) to or from memory system 1102. Memory system 1102 can be a storage product integrating memory controller 1106 and one or more memory devices 1104, including volatile memory devices, e.g., such as a dynamic random-access memory (DRAM) or a synchronous dynamic random access memory (SDRAM), just to name a few.

Memory devices 1104 may communicate with the memory controller 1106 via a system bus 1101. Data, a command/address (CMD/ADD), and a clock signal CLK may be transmitted and received between the memory devices 1104 and the memory controller 1106 via the system bus 1101. As described above, memory controller 1106 may send a RXOC_en signal to the RXOC circuit to initiate the operations at the RXOC circuit used for RXOC calibration.

Memory controller 1106 is coupled to memory devices 1104 and host 1108 and is configured to control memory devices 1104, according to some implementations. Memory controller 1106 can manage the data stored in memory devices 1104 and communicate with host 1108. In some implementations, memory controller 11106 is designed for operating in a high duty-cycle environment with solid-state disks (SSDs) or embedded multimedia card (eMMCs) used as data storage for mobile devices, such as smartphones, tablets, laptop computers, etc., and enterprise storage arrays. Memory controller 1106 can be configured to control operations of memory devices 1104, such as read, program/write, and/or erase operations. Memory controller 1106 can also be configured to manage various functions with respect to the data stored or to be stored in memory devices 1104 including, but not limited to bad-block management, garbage collection, logical-to-physical (L2P) address conversion, wear-leveling, etc. In some implementations, memory controller 1106 is further configured to process error correction codes (ECCs) with respect to the data read from or written to memory devices 1104. Any other suitable functions may be performed by memory controller 1106 as well, for example, formatting memory devices 1104. Memory controller 1106 can communicate with an external device (e.g., host 1108) according to a particular communication protocol. For example, memory controller 1106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 1106 in FIG. 11. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A peripheral circuit, comprising:
   a plurality of DQ circuits each comprising a respective plurality of decision feedback equalization (DFE) components;
   a resistor offset calibration (RXOC) circuit, comprising:
   an oscillator configured to:
      generate an internal clock source;
   a DQ-selection component configured to:
      select a DQ circuit from among the plurality of DQ circuits for calibration;
      select a DFE component from among a plurality of DFE components corresponding to the selected DQ circuit for calibration; and
      output a slicer result signal indicating an offset value received from the DFE component; and
   a control logic configured to:
      send a calibration signal associated with the DFE component to the selected DQ circuit based on the slicer result signal.

2. The peripheral circuit of claim 1, wherein:
   the DQ-selection component includes a first multiplexer (MUX) and a second MUX,
   the first MUX is configured to select the DQ circuit from among the plurality of DQ circuits for calibration, and
   the second MUX is configured to select the DFE component of the selected DQ circuit.

3. The peripheral circuit of claim 1, wherein the control logic is further configured to:
   receive the slicer result signal at a first edge of a clock cycle associated with the internal clock source.

4. The peripheral circuit of claim 3, wherein the control logic is further configured to:
   perform a binary search based on the slicer result signal to identify a pull-up code or a pull-down code for the DFE component.

5. The peripheral circuit of claim 4, wherein the control logic is further configured to:
   send the calibration signal to the DQ circuit at a second edge the clock cycle associated with the internal clock source, wherein the first edge is one of a rising edge or a falling edge, wherein the second edge is another of the rising edge or the falling edge, and wherein the calibration signal includes the pull-up code or the pull-down code.

6. The peripheral circuit of claim 5, wherein the DQ circuit is further configured to:

calibrate the DFE component based on a pull-up code or a pull-down code included in the calibration signal received from the control logic at the second edge of the clock cycle.

7. The peripheral circuit of claim 1, wherein the oscillator is further configured to:

receive an RXOC engage signal, wherein the internal clock source is generated in response to receiving the RXOC engage command.

8. The peripheral circuit of claim 7, wherein the oscillator is caused to generate the internal clock source without a column address strobe (CAS) command.

9. A memory device, comprising:

a memory array; and a peripheral circuit coupled to the memory array, the peripheral circuit comprising:

plurality of DQ circuits each comprising a respective plurality of decision feedback equalization (DFE) components;

a resistor offset calibration (RXOC) circuit, comprising:

an oscillator configured to:

generate an internal clock source;

a DQ-selection component configured to:

select a DQ circuit from among the plurality of DQ circuits for calibration;

select a DFE component from among a plurality of DFE components corresponding to the selected DQ circuit for calibration; and output a slicer result signal indicating an offset value received from the DFE component; and a control logic configured to:

send a calibration signal associated with the DFE component to the selected DQ circuit based on the slicer result signal.

10. The memory device of claim 9, wherein:

the DQ-selection component includes a first multiplexer (MUX) and a second MUX, the first MUX is configured to select the DQ circuit from among the plurality of DQ circuits for calibration, and the second MUX is configured to select the DFE component of the selected DQ circuit.

11. The memory device of claim 9, wherein the control logic is further configured to:

receive the slicer result signal at a first edge of a clock cycle associated with the internal clock source.

12. The memory device of claim 11, wherein the control logic is further configured to:

perform a binary search based on the slicer result signal to identify a pull-up code or a pull-down code for the DFE component.

13. The memory device of claim 12, wherein the control logic is further configured to:

send the calibration signal to the DQ circuit at a second edge the clock cycle associated with the internal clock source, wherein the first edge is one of a rising edge or a falling edge, wherein the second edge is another of the rising edge or the falling edge, and wherein the calibration signal includes the pull-up code or the pull-down code.

14. The memory device of claim 13, wherein the DQ circuit is further configured to:

calibrate the DFE component based on a pull-up code or a pull-down code included in the calibration signal received from the control logic at the second edge of the clock cycle.

15. The memory device of claim 9, wherein the oscillator is further configured to:

receive an RXOC engage signal, wherein the internal clock source is generated in response to receiving the RXOC engage command.

16. The memory device of claim 15, wherein the oscillator is caused to generate the internal clock source without a column address strobe (CAS) command.

17. A method for resistor offset calibration (RXOC) by a peripheral circuit, comprising:

generating, by an oscillator of an RXOC circuit, an internal clock source;

selecting, by a DQ-selection component of the RXOC circuit, a DQ circuit from among a plurality of DQ circuits for calibration;

selecting, by the DQ-selection component of the RXOC circuit, a decision feedback equalization (DFE) component from among a plurality of DFE components corresponding to the selected DQ circuit for calibration;

identifying, by the DQ-selection component of the RXOC circuit, an offset value associated with the DFE component;

outputting, by the DQ-selection component of the RXOC circuit, a slicer result signal received from the DFE component based on the offset value; and sending, by a control logic of the RXOC circuit, a calibration signal associated with the DFE component to the selected DQ circuit based on the slicer result signal.

18. The method of claim 17, wherein:

the DQ-selection component includes a first multiplexer (MUX) and a second MUX, the first MUX is configured to select the DQ circuit from among the plurality of DQ circuits for calibration, and the second MUX is configured to select the DFE component of the selected DQ circuit.

19. The method of claim 17, further comprising:

receiving, by the control logic of the RXOC circuit, the slicer result signal at a first edge of a clock cycle associated with the internal clock source.

20. The method of claim 19, further comprising:

performing, by the control logic of the RXOC circuit, a binary search based on the slicer result signal to identify a pull-up code or a pull-down code for the DFE component.

* * * * *